US009376147B2

(12) United States Patent
Craven et al.

(10) Patent No.: US 9,376,147 B2
(45) Date of Patent: Jun. 28, 2016

(54) TWO-STAGE CARGO FLOOR

(71) Applicants: Joel P Craven, Ann Arbor, MI (US);
Clyde W Ney, Jr., Lake Orion, MI (US);
Liliana Neag, Commerce Township, MI (US)

(72) Inventors: Joel P Craven, Ann Arbor, MI (US);
Clyde W Ney, Jr., Lake Orion, MI (US);
Liliana Neag, Commerce Township, MI (US)

(73) Assignee: FCA US LLC, Auburn Hills, MI (US)

( * ) Notice: Subject to any disclaimer, the term of this patent is extended or adjusted under 35 U.S.C. 154(b) by 49 days.

(21) Appl. No.: 14/200,163

(22) Filed: Mar. 7, 2014

(65) Prior Publication Data
US 2015/0251712 A1    Sep. 10, 2015

(51) Int. Cl.
| B62D 43/06 | (2006.01) |
| B60R 7/04 | (2006.01) |
| B60R 5/04 | (2006.01) |
| B60R 13/01 | (2006.01) |
| B62D 25/20 | (2006.01) |
| B60N 3/12 | (2006.01) |

(52) U.S. Cl.
CPC . *B62D 43/06* (2013.01); *B60R 5/04* (2013.01); *B60R 7/04* (2013.01); *B60N 3/12* (2013.01); *B60R 13/013* (2013.01); *B62D 25/20* (2013.01)

(58) Field of Classification Search
CPC .......... B60N 3/12; B62D 25/20; B62D 43/06; B60R 13/013; B60R 7/04; B60R 7/05
USPC ..................................... 296/37.2, 37.14, 26.1
See application file for complete search history.

(56) References Cited

U.S. PATENT DOCUMENTS

| 4,093,071 | A | | 6/1978 | Stahl et al. |
| 5,257,846 | A | | 11/1993 | Kanai et al. |
| 5,636,890 | A | * | 6/1997 | Cooper ........................ 296/37.1 |
| 5,836,637 | A | | 11/1998 | Laginess et al. |
| 6,752,304 | B1 | | 6/2004 | Hotary et al. |
| 7,188,881 | B1 | * | 3/2007 | Sturt et al. ................... 296/26.1 |
| 7,503,610 | B2 | | 3/2009 | Karagitz et al. |
| 8,534,736 | B1 | | 9/2013 | Whalen |
| 2010/0187857 | A1 | | 7/2010 | Fischer et al. |
| 2011/0101721 | A1 | | 5/2011 | Sogame et al. |

FOREIGN PATENT DOCUMENTS

CA        2622266 A1    8/2008

OTHER PUBLICATIONS

International Search Report and Written Opinion dated Jun. 29, 2015 for International Application No. PCT/US2015/018845, International Filing Date Mar. 5, 2015.

* cited by examiner

*Primary Examiner* — Joseph D Pape
*Assistant Examiner* — Dana Ivey
(74) *Attorney, Agent, or Firm* — Ralph E. Smith

(57) ABSTRACT

A storage receptacle integrated into the floor of a vehicle. The storage receptacle includes a housing. The housing includes a collar, a lower surface, and a plurality of side surfaces extending between the collar and the lower surface. The side surfaces each define an upper surface and an intermediate surface that extend continuously around an inner periphery of the housing and are oriented substantially parallel with the collar and the lower surface. A lid is configured to rest on the upper surface in a first storage position when the lid has a first orientation, and is configured to rest on the intermediate surface in a second storage position when the lid has a second orientation, wherein the second orientation is rotated 90 degrees relative to the first orientation.

19 Claims, 5 Drawing Sheets

TWO-STAGE CARGO FLOOR

FIELD

The present disclosure relates to a vehicle including a cargo area that is configured to operate in two stages.

BACKGROUND

This section provides background information related to the present disclosure which is not necessarily prior art.

With ever increasing pressure from automotive consumers, flexibility and adaptability of vehicle interiors is increasingly required in order to provide a vehicle adapted to meet the broad customer demand. Further, with increased social awareness of a vehicle's impact on the environment, there is an increasing demand to minimize the overall mass of vehicle while still meeting the feature requirements of the consumer. By reducing the mass of the interior components of the vehicle, several goals can be achieved. Among these goals is the overall weight of the vehicle, which can be minimized to thereby reduce the power and fuel required to operate the vehicle.

The reductions of the size of the interior components of vehicles have led to a need for more efficient use of interior space. Various types of storage containers for the interior of the vehicle have been proposed to handle this ever increasing need. Sport utility vehicles, as well as mini-vans, carry an increasing number of occupants. The increase in occupants raises the needed to efficiently provide a storage space in a vehicle.

SUMMARY

This section provides a general summary of the disclosure, and is not a comprehensive disclosure of its full scope or all of its features.

The present disclosure provides a storage receptacle integrated into the floor of a vehicle. The storage receptacle includes a housing. The housing includes a collar, a lower surface, and a plurality of side surfaces extending between the collar and the lower surface. The side surfaces each define an upper surface and an intermediate surface that extend continuously around an inner periphery of the housing and are oriented substantially parallel with the collar and the lower surface. A lid is configured to rest on the upper surface in a first storage position when the lid has a first orientation, and is configured to rest on the intermediate surface in a second storage position when the lid has a second orientation, wherein the second orientation is rotated 90 degrees relative to the first orientation.

The present disclosure also provides a storage receptacle integrated into a floor of a vehicle for a spare tire. The storage receptacle includes a housing. The housing includes a collar, a lower surface configured to support the spare tire, and a plurality of side surfaces extending between the collar and the lower surface. The side surfaces each define an upper surface and an intermediate surface that extend continuously around an inner periphery of the housing and are oriented substantially parallel with the collar and the lower surface. A lid is configured to rest on the upper surface in a first storage position when the lid has a first orientation, and configured to rest on the intermediate surface in a second storage position when the lid has a second orientation, wherein the second orientation is rotated 90 degrees relative to the first orientation. The collar is substantially co-planar with the floor, and the lid in the first storage position is substantially co-planar with the floor. When the lid is in the second storage position, the lid is positioned in a recessed position relative to the floor.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
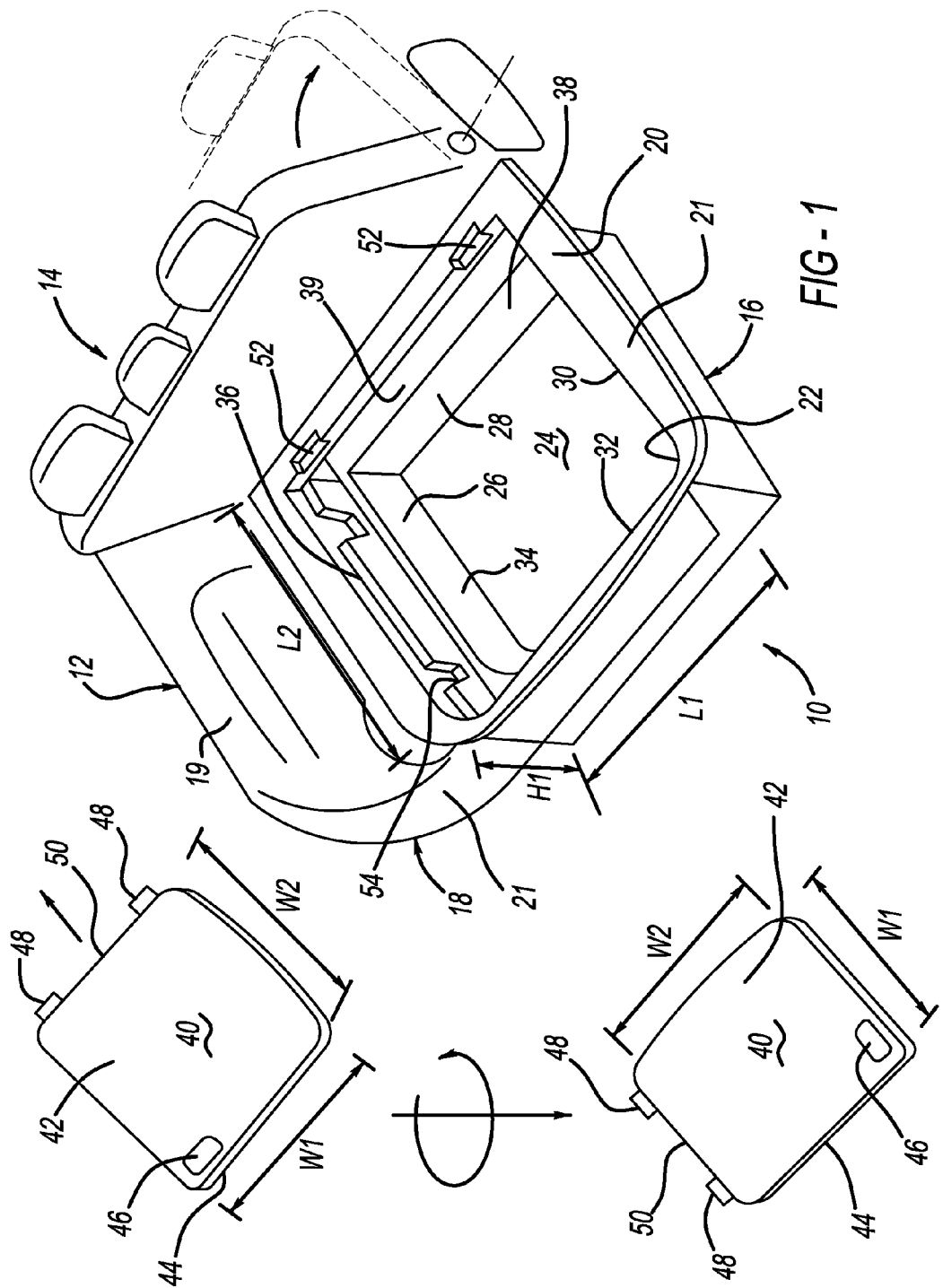
FIG. 1 is a partial perspective view of a storage receptacle according to a principle of the present disclosure that is integrated into the rear cargo storage area of a vehicle.

Example embodiments will now be described more fully with reference to the accompanying drawings.

With reference to FIGS. 1-5, a storage receptacle 10 for a vehicle 12 is illustrated. Storage receptacle 10 is illustrated as being positioned behind a second row seat 14, but may be located at any position in the vehicle 12. Storage receptacle 10 includes a tub-shaped housing 16, which is preferably integrated into the floor 18 of vehicle 12. A quarter panel trim 19 and rear scruff trim 21 peripherally surround storage receptacle 10. Housing 16 is formed from a polymeric material or a metal material, as is known in the art. Preferably, housing 16 is injection molded from a polymeric material such that housing 16 is a monolithic member.

Figure 3:
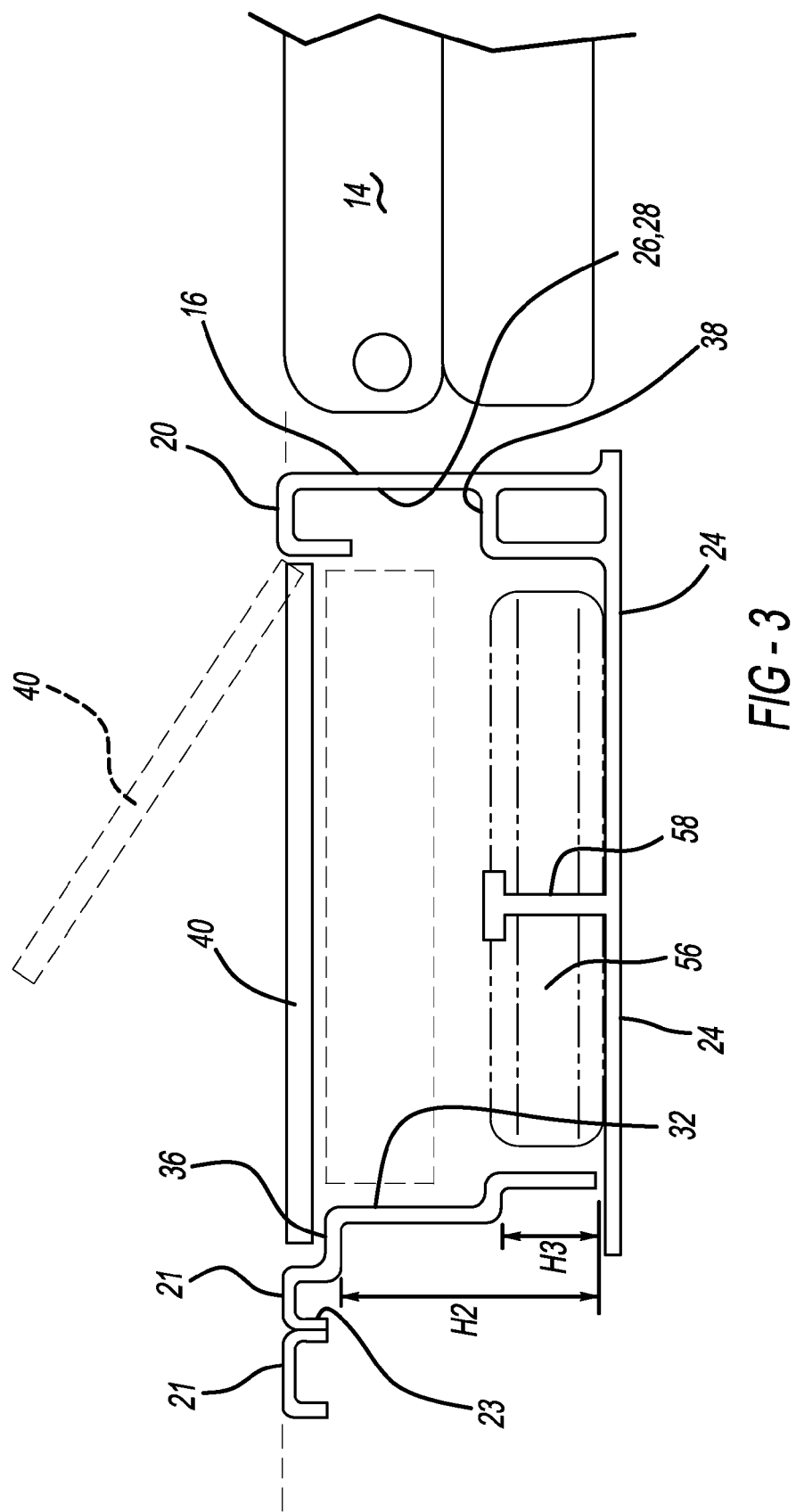
FIG. 3 is a cross-sectional view of the storage receptacle illustrated in FIG. 2.
Figure 4:
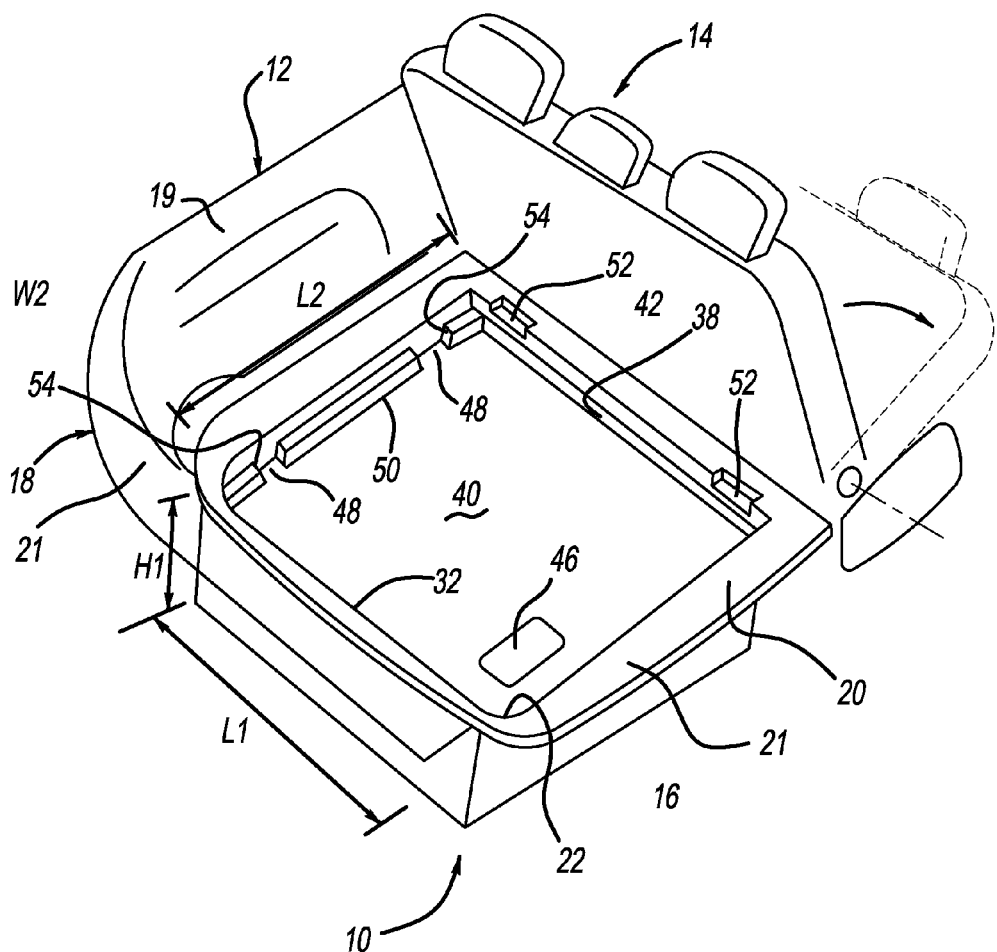
FIG. 4 is a partial perspective view of the storage receptacle of FIG. 1, with a lid in a second storage position.

Housing 16 includes an upper collar 20 that extends about a periphery 22 of housing 16 substantially co-planar with floor 18. That is, a first portion 21 of collar 20 extends substantially co-planar with floor 18, and a second portion 23 of collar 20 extends orthogonal to the first portion 21 (FIG. 3). Second portion 23 mates with floor 18 by rivets (not shown), or any other attachment device known to one skilled in the art. A lower surface 24 of housing 16 that is oriented substantially parallel with collar 20 defines a bottom 24 of storage receptacle 10. It should be understood, however, that lower surface 24 is not required to be oriented substantially a parallel with collar 20. In contrast, lower surface 22 can be sloped or contoured as desired.

A plurality of side surfaces 26 extend between collar 20 and lower surface 22. Side surfaces 26 include a first side surface 28, a second side surface 30, a third side surface 32, and a fourth side surface 34. First and third side surfaces 28 and 32 extend parallel with each other and each include a first length L1. Second and fourth side surfaces 30 and 34 extend parallel with each other and each include a second length L2. As illustrated L2 is less than L1. It should be understood, however, that L1 may be less than L2, without departing from the scope of the present disclosure. Each side surface 26 includes a height H1.

Side surfaces 26 each include an upper surface 36 and an intermediate surface 38 integrated therein. Upper surface 36 is positioned at a height H2 relative to lower surface 24. Intermediate surface 38 is positioned at a height H3 relative to lower surface 24. As illustrated, H2 is greater than H3. Upper surface 36 and intermediate surface 38 may each be integrated into each side surface 26. Upper surface 36 extends continuously about second, third and fourth side surfaces 30, 32, and 34. Intermediate surfaces 38 continuously extends about an entire inner periphery 39 of housing 16. Upper and intermediate surfaces 36 and 38 are oriented substantially parallel with collar 20 and lower surface 22, and each provide an abutment surface for a lid 40 to rest on, as will be described in more detail below.

Figure 2:
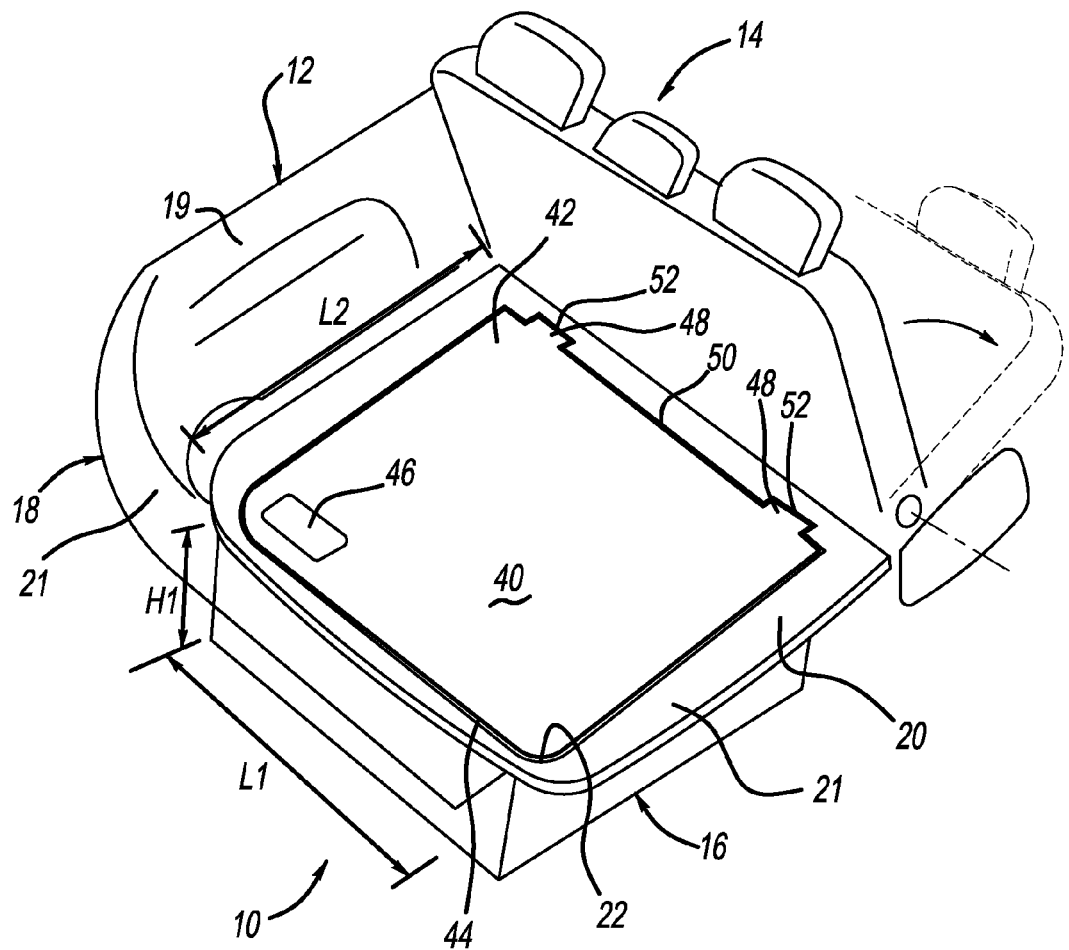
FIG. 2 is a partial perspective view of the storage receptacle of FIG. 1, with a lid in a first storage position.

According to the present disclosure, lid 40 is operatively configured to enclose storage receptacle 10 in two positions. In a first storage position, lid 40 is operatively configured to rest on upper surface 36. In the first storage position, storage receptacle 10 is closed and a substantially planar surface is formed by lid 40 and floor 18 (FIG. 2). In other words, a flat load floor is created by lid 40 and floor 18. Moreover, if seats 14 are in a folded position (shown in phantom in FIG. 1), floor 18, lid 40, and seats 40 form a substantially planar load floor surface. In a second storage position, lid 40 is operatively configured to rest on intermediate surface 36 such that storage receptacle has a volume V (FIG. 5), which allows for larger cargo items such as luggage and the like to be more easily stored in vehicle 12. In the second storage position, a user may store items in storage receptacle 10 to increase functionality of vehicle 12. Lid 40 includes a first width W1 and a second width W2. First width W1 is substantially equal to L1 such that lid 40 rests on upper surface 36 in the first storage position. Second width W2 of lid 40 is substantially equal to L2 such that lid 40 rests on intermediate surface 38 in the second storage position.

Similar to housing 16, lid 40 may be injection molded from a polymeric material such that lid 40 is a monolithic member. It should be understood, however, that lid 40 can be formed of any material known to one skilled in the art. Lid 40 includes an upper major surface 42 and a lower major surface 44. Upper major surface 42 can define a recess 46 that is operable as a pull pocket or handle, which allows a user to grasp and move lid 40 between an open and closed position, or to lift, rotate, and move lid 40 from the first storage position to the second storage position.

To allow lid 40 to be moved between an open position and a closed position (see, e.g., FIG. 3), lid 40 includes a pair of hinge elements 48 projecting from a side 50 thereof. Hinge elements 48 are preferably unitary with lid 40, but may be separately formed and subsequently fixed to lid 40. Regardless, hinge elements 48 include a pair of nubs (not shown) on opposing sides thereof that engage with a slot (not shown) formed in a pair of recesses 52 formed in collar 20 that allow side 50 of lid 40 to be hingedly coupled to collar 20. Accordingly, when lid 40 is in the first storage position (FIG. 2), a flat surface co-planar with floor 18 is provided. Alternatively, if access to housing 16 is desired, lid 40 is rotatable to allow access to an interior of storage receptacle 10.

Figure 5:
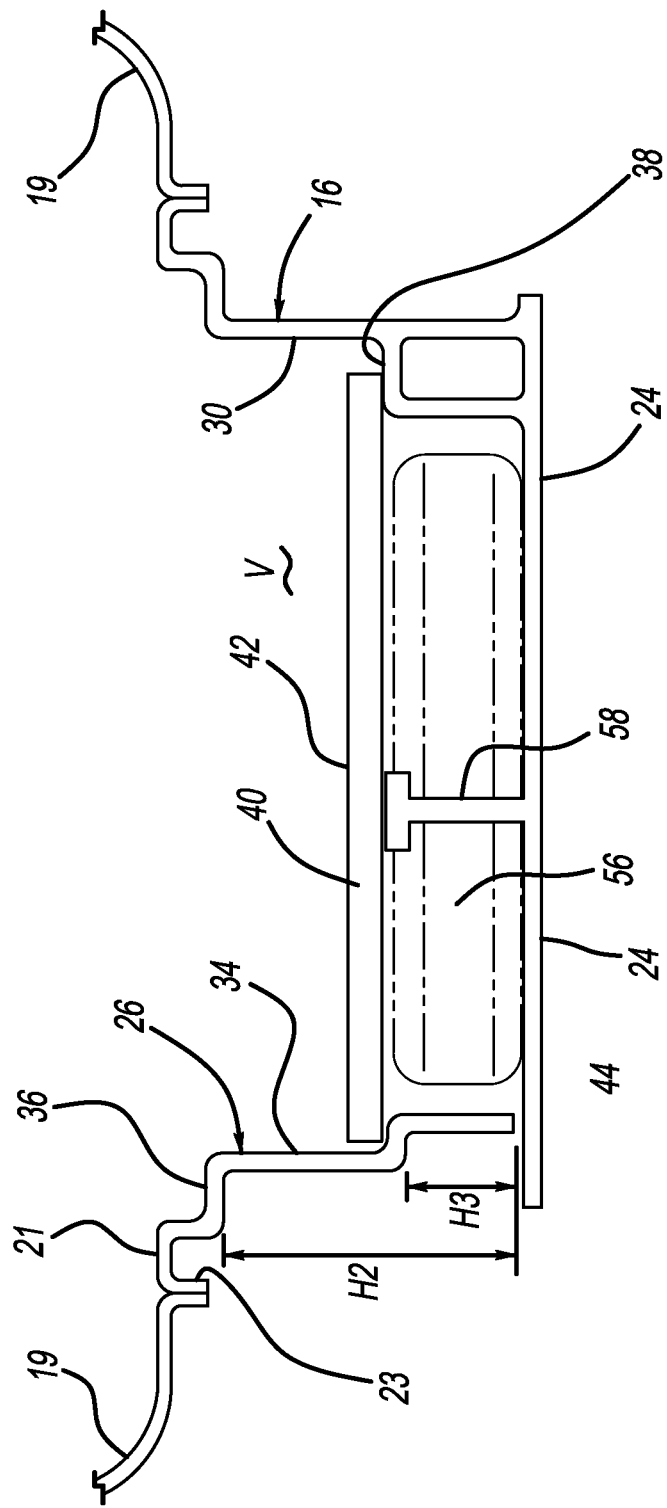
FIG. 5 is a cross-sectional view of the storage receptacle illustrated in FIG. 4.

To switch between the first storage position (FIG. 2) and the second storage position (FIG. 4), lid 40 is lifted and hinge elements 48 are disengaged from recesses 52. Lid 40 is then rotated ninety degrees and placed upon intermediate surface 38. In this manner, lid 40 does not need to be removed from vehicle 12 to increase the cargo volume of vehicle 12. Rather, lid 40 is configured to be simply rotated and replaced into receptacle 10. To account for hinge elements 48 extending outward from side 50, upper surface 36 includes a pair of depressions 54 formed therein. Depressions 54 are illustrated as being wider at upper surface 36 in comparison to a width at intermediate surface 38, which allows an operator to more easily align hinge elements 48 with depressions 54. It should be understood, however, that a width of depressions 54 can be substantially equal along an entire length thereof. Although depressions 54 are illustrated as being formed on fourth side surface 34, it should be understood that upper surface 36 formed along second side surface 30 can include depressions 54 as well. As best shown in FIG. 5, when lid 40 rests on intermediate surface 38, access to an interior of storage receptacle 10 is unobstructed, which increases the storage capacity of vehicle 12.

As illustrated in FIGS. 3 and 5, storage receptacle 10 is configured to carry a spare tire 56. In this regard, spare tire 56 rests on bottom surface 24 and is hidden from view by lid 40, whether lid 40 is in the first storage position at upper surface 36 or in the second storage position at intermediate surface 38. To secure tire 56 to bottom surface 24, a tie down bolt or screw 58 may extend upward from bottom surface 24. Storing tire 56 within vehicle 12 increases the ease with which tire 56 is accessed in comparison to when tire 56 is stored beneath vehicle 12. Further, due to lid 40 being configured to enclose storage receptacle 10 in multiple storage positions, the functionality of storage receptacle 10 for spare tire 56 is increased.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A storage receptacle integrated into the floor of a vehicle, comprising:
    a housing, the housing including a collar, a lower surface, and a plurality of side surfaces extending between the collar and the lower surface, the side surfaces each defining an upper surface and an intermediate surface that extend around an inner periphery of the housing; and
    a lid, the lid configured to rest on the upper surface in a first storage position when the lid has a first orientation arranged in parallel with the collar and the lower surface, and configured to rest on the intermediate surface in a second storage position when the lid has a second orientation arranged in parallel with the collar and the lower surface, the second orientation being where the lid is rotated in plane 90 degrees relative to the first orientation.

2. The storage receptacle of claim 1, wherein the lid includes at least one hinge element.

3. The storage receptacle of claim 2, wherein the at least one hinge element is configured to mate with a recess formed in the collar in the first storage position.

4. The storage receptacle of claim 3, wherein the lid is pivotable relative to the collar.

5. The storage receptacle of claim 2, wherein the upper surface includes at least one depression formed therein, and the at least one hinge element is configured to mate with the at least one depression in the second storage position.

6. The storage receptacle of claim 5, wherein the depression includes a first width at the upper surface and a second width at the intermediate surface, the second width being less than the first width.

7. The storage receptacle of claim 1, wherein the collar is substantially co-planar with the floor, and the lid in the first storage position is substantially co-planar with the floor.

8. The storage receptacle of claim 1, wherein the lid includes a handle.

9. The storage receptacle of claim 1, wherein the housing and the lid are each injection molded from polymeric materials.

10. The storage receptacle of claim 1, wherein the storage receptacle is configured to provide access to a spare tire.

11. The storage receptacle of claim 1, wherein when the lid is in the second storage position, the lid is positioned in a recessed position relative to the floor.

12. A storage receptacle integrated into a floor of a vehicle for a spare tire, comprising:
 a housing, the housing including a collar, a lower surface configured to support the spare tire, and a plurality of side surfaces extending between the collar and the lower surface, the side surfaces each defining an upper surface and an intermediate surface that extend around an inner periphery of the housing; and
 a lid, the lid configured to rest on the upper surface in a first storage position when the lid has a first orientation arranged in parallel with the collar and the lower surface, and configured to rest on the intermediate surface in a second storage position when the lid has a second orientation arranged in parallel with the collar and the lower surface, the second orientation being where the lid is rotated in plane 90 degrees relative to the first orientation,
 wherein the collar is substantially co-planar with the floor, and the lid in the first storage position is substantially co-planar with the floor; and
 wherein when the lid is in the second storage position, the lid is positioned in a recessed position relative to the floor.

13. The storage receptacle of claim 12, wherein the lid includes at least one hinge element.

14. The storage receptacle of claim 13, wherein the at least one hinge element is configured to mate with a recess formed in the collar in the first storage position.

15. The storage receptacle of claim 14, wherein the lid is pivotable relative to the collar.

16. The storage receptacle of claim 13, wherein the upper surface includes at least one depression formed therein, and the at least one hinge element is configured to mate with the at least one depression in the second storage position.

17. The storage receptacle of claim 16, wherein the depression includes a first width at the upper surface and a second width at the intermediate surface, the second width being less than the first width.

18. The storage receptacle of claim 12, wherein the lid includes a handle.

19. The storage receptacle of claim 12, wherein the housing and the lid are each injection molded from polymeric materials.

* * * * *